(12) United States Patent
Fukuzawa

(10) Patent No.: US 6,297,828 B1
(45) Date of Patent: Oct. 2, 2001

(54) LINE DRAWING USING GRAPHICS PROCESSING

(75) Inventor: Sanae Fukuzawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/878,126

(22) Filed: Jun. 18, 1997

(30) Foreign Application Priority Data

Jun. 19, 1996 (JP) .................................................... 8-158339

(51) Int. Cl.[7] .................................................. G06T 11/00
(52) U.S. Cl. ................................................................ 345/443
(58) Field of Search ..................................... 345/441–443

(56) References Cited

U.S. PATENT DOCUMENTS 5,920,323 * 7/1999 Fukuzawa ............................ 345/441

OTHER PUBLICATIONS

Foley et al. "Computer Graphics Principles and Practice" Second Edition pp. 72–81, 104–107, 1990.*

* cited by examiner

Primary Examiner—Almis R. Jankus
(74) Attorney, Agent, or Firm—Fitzpatrick, Cella, Harper & Scinto

(57) ABSTRACT

A technique in which processing is applied indiscriminately to the line segments that construct a figure is replaced by a technique through which the optimum processing stage is selected depending upon drawing attributes (line width, slope of the line segment and shape, etc.) of the line segments per se and the particular figure in which the line segments are being used. This makes it possible to execute efficient drawing of graphics. To this end, it is determined whether a given line segment is horizontal or vertical, and ordinary processing is executed if the line segment is horizontal or vertical. In a case where the line segment is neither horizontal nor vertical and the width of the line segment is less than 2, a pen step conforming to the slope is used. If the line width is equal to or greater than 2, the corresponding pen step is used.

33 Claims, 18 Drawing Sheets

NOTE: fixL16_MAX : MAXIMUM VALUE IN FIXED-POINT NOTATION.
cslope IS REPRESENTED BY 32 bits IN FIXED-POINT NOTATION.

slope = dy / dx
dir = y / x
cvertex = ( dx, −dy )

<PHYSICAL COORDINATE DATA>

| SCANNING LINE | LEFT SIDE | RIGHT SIDE | BLACKENED AREA |
|---|---|---|---|
| y0 | x1 | x1 | x1 |
| y1 | x1 | x2 | x1,x2 →|
| y2 | x1 | x2 | x1,x2 |

N = 0

N = 1

N = 3

LINE DRAWING USING GRAPHICS PROCESSING

BACKGROUND OF THE INVENTION

This invention relates to a graphics processing apparatus and method and, more particularly, to a graphics drawing apparatus and method for drawing lines.

In order to draw a straight line, which is given by logical coordinate values, on a display device, it is necessary to execute processing whereby the area which the straight line, which is calculated from the logical coordinates, occupies on the physical coordinate system of the display device is determined in accordance with a fixed rule. This processing shall be referred to as "line drawing processing" below.

In order to draw a straight line having width in conventional line drawing processing, the method employed involves creating a polygonal pen corresponding to the width of the line and extracting a pen step that conforms to the required line width and line slope, whereby a thickness commensurate with the line width can be expressed regardless of the angle defined by the slope of the straight line.

1. Polygonal pen and related data structure

A polygonal pen partitions a quadrant having a radius the same as that of a line thickness W in accordance with a suitable partitioning rule and adopts a vector from a certain vertex to the neighboring vertex as a drawing element (hereinafter a "pen step"). The pen step corresponding to the width of one line starts from a horizontal step and ends with a vertical step (see FIG. 1).

Each pen step includes data comprising slope, direction from the center to the vertex and coordinates of the vertex. Each pen step possesses data in which these three values make up one set, and entries to all pen-step data are held sequentially from a line width of zero to a maximum line width.

Furthermore, an entry to a horizontal pen step and an entry to a vertical pen step are held in the form of a table in correspondence with each line width, and the necessary pen step of the line width is extracted by searching the table (see FIG. 3).

2. Drawing processing utilizing polygonal pen How a straight line of line width "2" is drawn will be described in simple terms with reference to FIGS. 1 and 2.

(1) A polygonal pen conforming to the width of the straight line to be drawn is created.

(2) As shown in FIG. 2, a pen step having a slope nearest to the vertical with respect to the slope of a straight line connecting two points A and B is selected from the pen table shown in FIG. 1 [the pen table created in (1) above].

(3) Since the pen having the vertex coordinates (1,−0.25) in FIG. 1 is the nearest in this example, RTop is found by adding (1,−0.25) to the coordinates of A and LTop is found by subtracting (1,−0.25) from the coordinates of A.

(4) Auxiliary lines having the same slopes as the straight lines are extended from RTop and LTop, and the intersections of these auxiliary lines with the base line of a scanning line are adopted as the x coordinates of a contour line at this scanning line. One of these coordinates is found for each of the two auxiliary lines having RTop and LTop as their starting points. Thus, one set of x coordinates is obtained for one scanning line. The portion lying between these x coordinates is made black.

(5) This processing is executed, with regard to every scanning line, from the starting point (A) to the end point (B) to obtain the contour line of the entire straight line.

With this drawing method utilizing the polygonal pen, a straight line is not thickened only in a fixed direction at all times with regard to horizontal lines. The method is so contrived that a straight line is drawn with substantially the same width regardless of the angle as well.

Basically this processing is executed once with regard to a straight line but is executed repeatedly with regard to each line segment in case of a polygon or polygonal line. Further, in the case of a curve or ellipse, the shape is partitioning into very small segments, a polygonal approximation is performed and the above-described processing-is executed.

In a case where a special shape is being used at the end point of a straight line or at the connection between two straight lines, the coordinates of the respective contour lines are determined by utilizing the polygonal pen.

In selecting the optional pen step for the slope of a straight line using the conventional method described above, it is necessary to execute processing in which sequentially arrayed pen steps are extracted one at a time and it is determined whether each is suitable or not. Further, coordinates of a contour line are determined for every scanning line based upon the pen-step information. Consequently, numerical calculations are numerous and processing takes times. Furthermore, since the number of pen steps possessed by the polygonal pen increases in dependence upon the line width, creating the polygonal pen takes time when line width is great, namely in the case of a thick line.

In the drawing of graphics using line segments as structural elements, there are instances where, depending upon the figure of the original graphic, problems relating to shape do not arise even when all processing is not executed in its entirety. Rather, there are instances where processing speed is a bigger problem than shape. This is the case for straight lines having a high frequency of use.

Executing drawing processing indiscriminately with regard to such line segments using the above-described technique is inefficient.

The technique described above is effective for shaping a straight line having a large width and an arbitrary angle. However, in a case where line width is sufficiently small in comparison with the pixel (dot) size of the display device, there is almost no effect in terms of dealing with angles finely. On the contrary, the adverse effects of error due to coordinate calculations become conspicuous and there is the possibility that the original shape will become unrecognizable.

SUMMARY OF THE INVENTION

According, an object of the present invention is to provide a graphics processing apparatus and method whereby, rather than using a technique in which processing is applied indiscriminately to the line segments that construct a figure, the optimum processing stage is selected depending upon the drawing attributes (line width, slope of the line segment and shape, etc.) of the line segments per se and the particular figure in which the line segments are being used, thereby making it possible to execute efficient drawing of graphics.

According to the present invention, the foregoing object is attained by providing a graphics processing apparatus for drawing line segments in a bitmap memory using polygonal pen data, comprising first judging means for judging whether a line segment is horizontal or vertical, and second judging means for judging line width in a case where the first judging means has judged that a line segment of interest is neither a horizontal nor a vertical line segment, wherein in a case where the first judging means has judged that a line segment of interest is either a horizontal or a vertical line segment, the polygonal pen data for this line segment is not used and the positions of the line segment of interest on the right side and on the left side of each scanning line are decided based upon coordinates of the starting point and end point and the line width of the line segment, and in a case where the second judging means has judged that the line width is less than a predetermined line width, a horizontal or vertical pen step conforming to the slope of the line segment is employed, and in a case where the second judging means has judged that the line width is equal to or greater than the predetermined line width, plural stages of polygonal-pen data are employed and the positions of the line segment on the right side and on the left side are decided.

In another aspect of the present invention, the conventional technique continues to be used in case of ordinary drawing of a straight line but drawing of a straight line in which the minimum shape is preserved is made possible under conditions in which satisfactory results of drawing are not obtained with the conventional technique.

According to the present invention, this is achieved by providing a graphic processing apparatus for drawing line segments in a bitmap memory, comprising judging means for judging whether the slope of a given line segment is neither vertical nor horizontal but is nearly vertical or nearly horizontal, first arithmetic means for obtaining, from the starting point and end point of the line segment, number of partitions with regard to the vertical or horizontal direction in a case where the judging means has judged that the line segment has a slope that is nearly vertical or nearly horizontal, second arithmetic means for calculating break-point positions of each line segment element contained by the line segment in dependence upon the number of partitions obtained by the first arithmetic means, and means for creating straight-line data of each line segment element in accordance with the break-point positions calculated by the second arithmetic means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A first embodiment of the present invention will now be described in detail with reference to the accompanying drawings.

It should be noted that this embodiment deals with a case in which one to two slanted lines, horizontal lines and vertical lines are drawn as lines having width.

Figure 1:
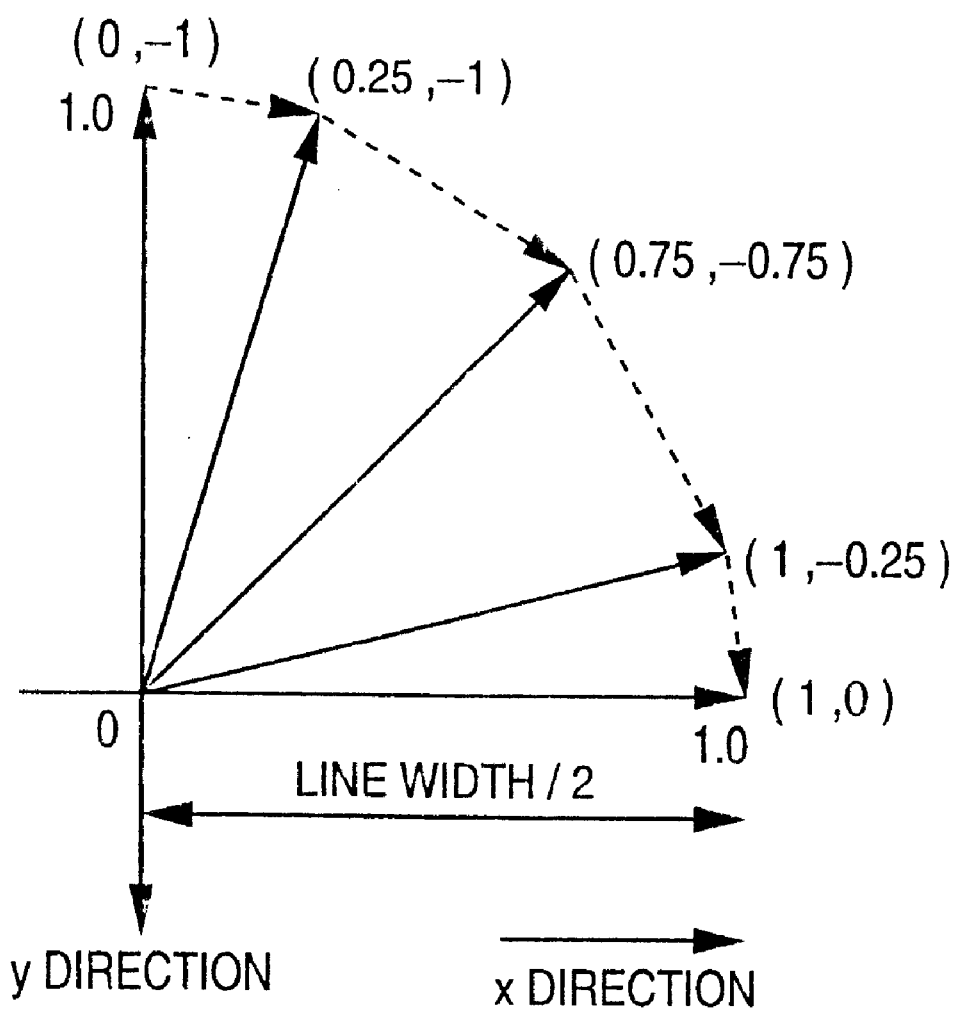
FIG. 1 is a diagram illustrating the concept of a polygonal pen according to an embodiment of the present invention.
Figure 2:
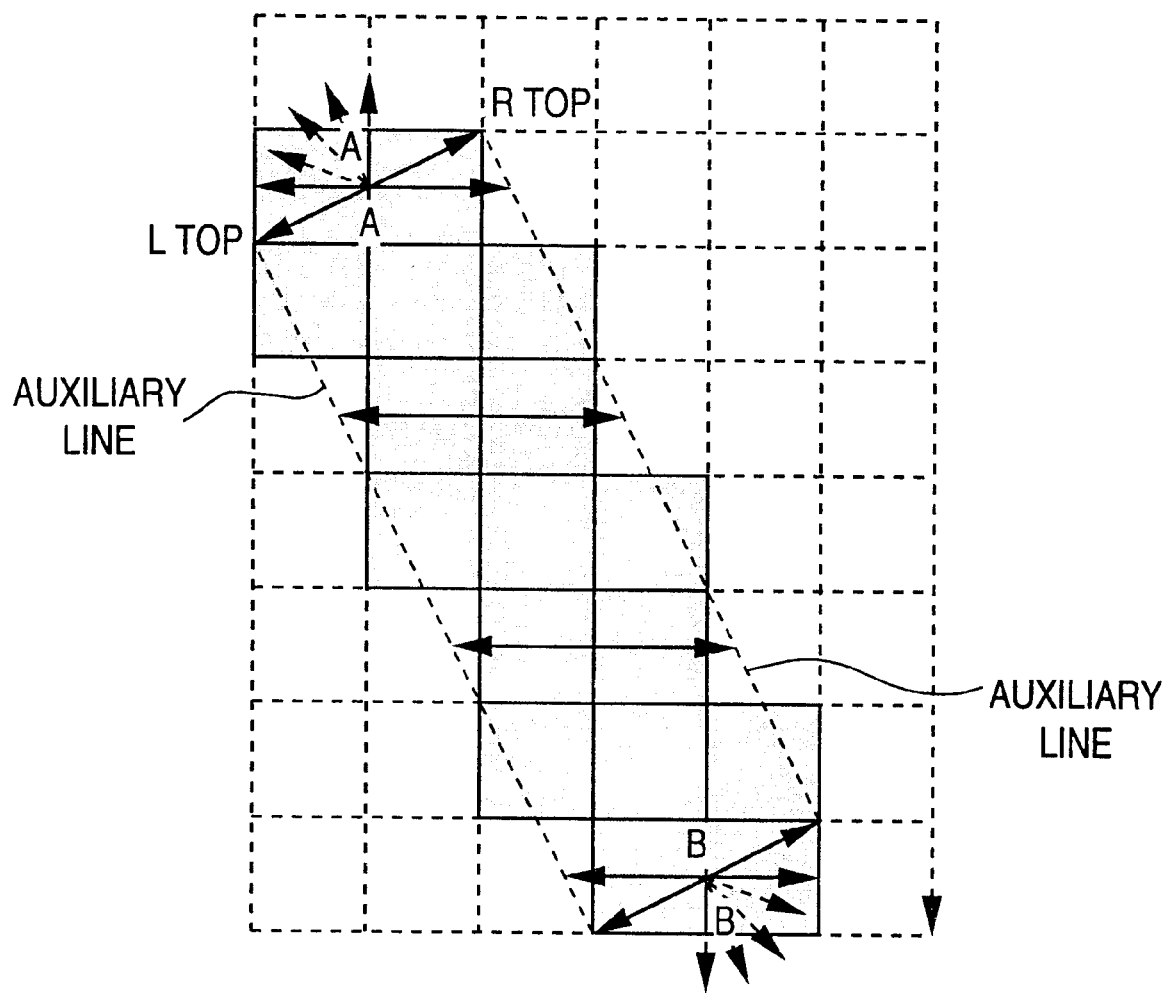
FIG. 2 is a diagram showing an example of the relationship between a line drawing and dots in this embodiment.
Figure 3:
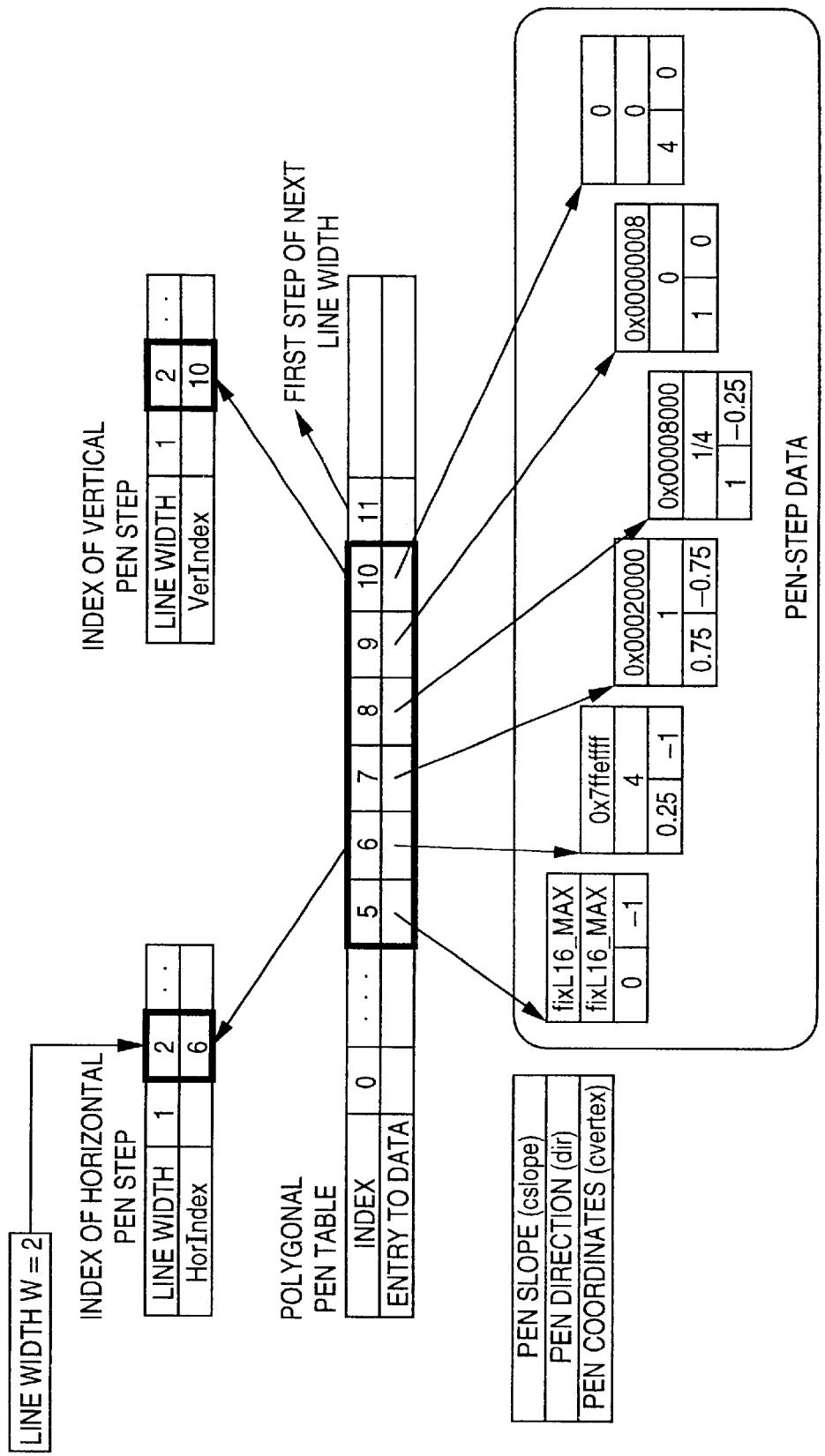
FIG. 3 is a diagram showing the structure of a polygonal pen in this embodiment.
Figure 4:
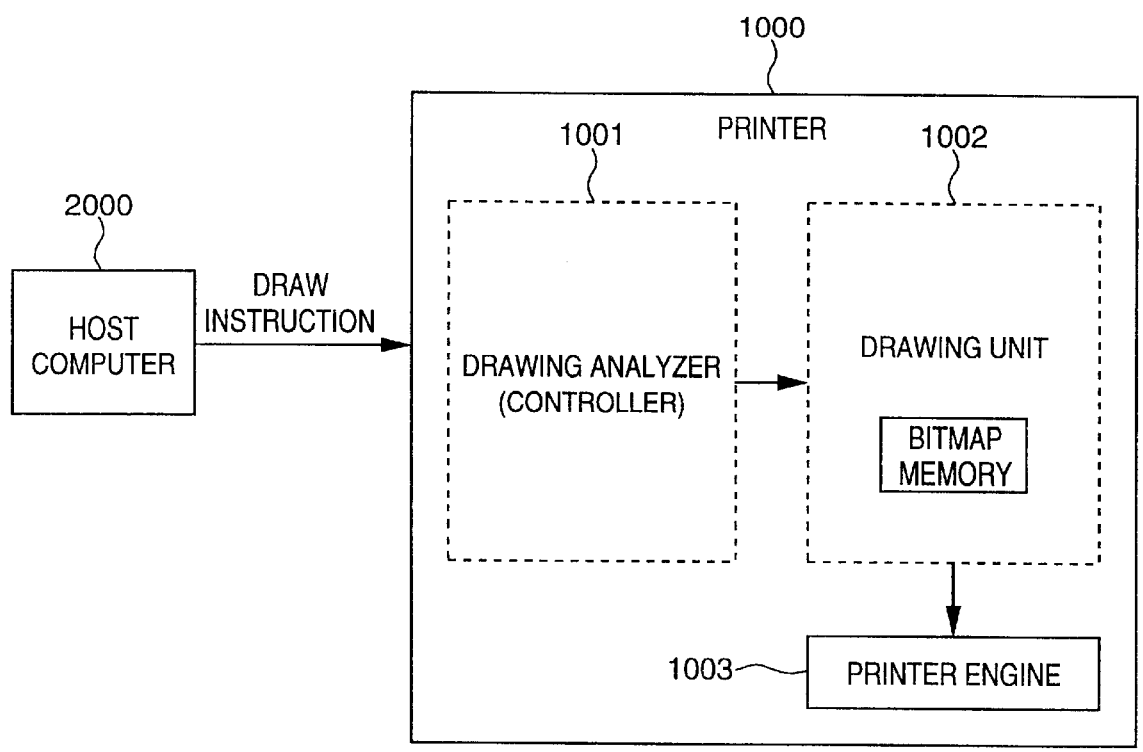
FIG. 4 is a conceptual view showing the configuration of a printing system in this embodiment.

FIG. 4 is a conceptual view showing the configuration of a system for implementing this embodiment, in which the invention is applied to a printer apparatus. The flow of data in FIG. 4 is as set forth below.

Print data (which includes a draw instruction) is output from a host computer 2000 to a printer apparatus 1000. The printer apparatus analyzes the print data using a drawing analyzer 1001, whence the results of analysis are sent to a drawing unit 1002. The latter is provided with a bitmap memory in which line drawings and the like are drawn. When a certain amount (e.g. the equivalent of one page) of drawing processing has been completed, the processed data is sent to printer engine 1003 through a prescribed procedure, whereby printing is performed.

Figure 12:
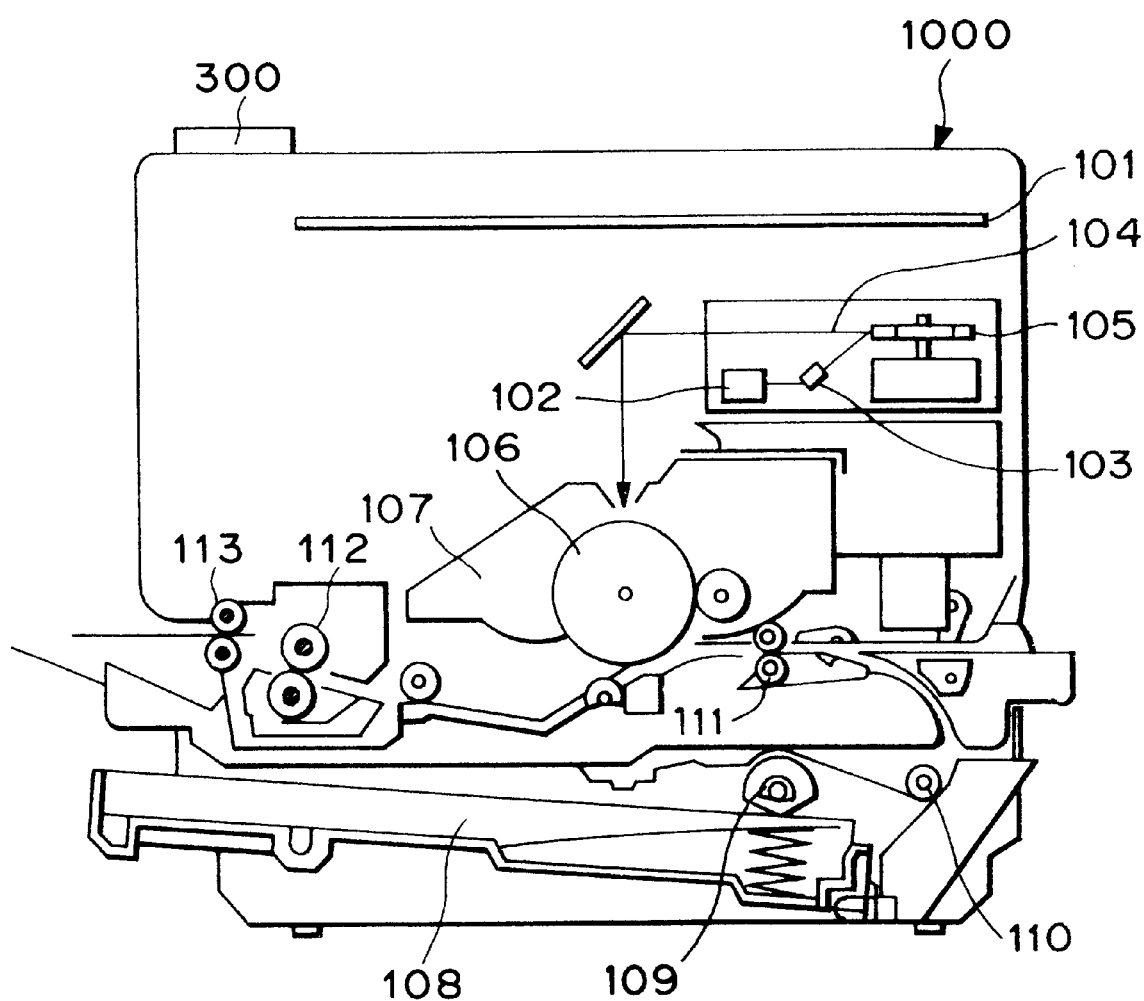
FIG. 12 is a sectional view showing the structure of a printer apparatus in this embodiment.

FIG. 12 is a sectional view showing the internal structural details of the printer apparatus 1000 in this embodiment.

Character information (character codes), form information or macro instruction supplied by the externally connected host computer 2000 enter and are stored in the printer apparatus 1000 shown in FIG. 12. The printer apparatus 1000 creates the corresponding character codes patterns or form patterns, etc., in accordance with the entered information and forms the images on recording paper serving as the recording medium. The apparatus includes a control panel 300 having control switches and LCD indicators, and a printer control unit 101 for performing overall control of the printer apparatus 1000 and analyzing the character information supplied by the host computer 2000. The control unit 101 executes processing primarily for analyzing and drawing line drawings.

At the final stage of printing, the drawn image data is converted to a video signal, which is output to a laser driver 102. The latter is a circuit which drives a semiconductor laser 103. Specifically, in conformity with the entered video signal, the laser driver 102 turns on and off a laser beam 104 emitted by the semiconductor laser 103.

The laser beam 104 is made to scan an electrostatic drum 106 back and forth by a rotating polygon mirror 105. As a result, an electrostatic latent image such as a line-drawing pattern is formed on the electrostatic drum 106. The electrostatic latent image is developed by a developing unit 107 surrounding the electrostatic drum 106, after which the developed image is transferred to the recording paper.

Cut sheets of paper are used as the recorded paper. The cut sheets are stored in a paper cassette 108 loaded in the printer apparatus 1000 and introduced into the apparatus by a paper feed roller 109 and conveyance rollers 110, 111, whereby the cut sheets are supplied to the electrostatic drum 106. A toner image that has become affixed to the electrostatic drum 106 by the action of the developing unit 107 is transferred to the recording paper conveyed to the drum. The recording paper is then conveyed to a fixing unit 112, which proceeds to fix the toner. The recording paper finally is ejected from the apparatus by discharge rollers 113.

Figure 13:
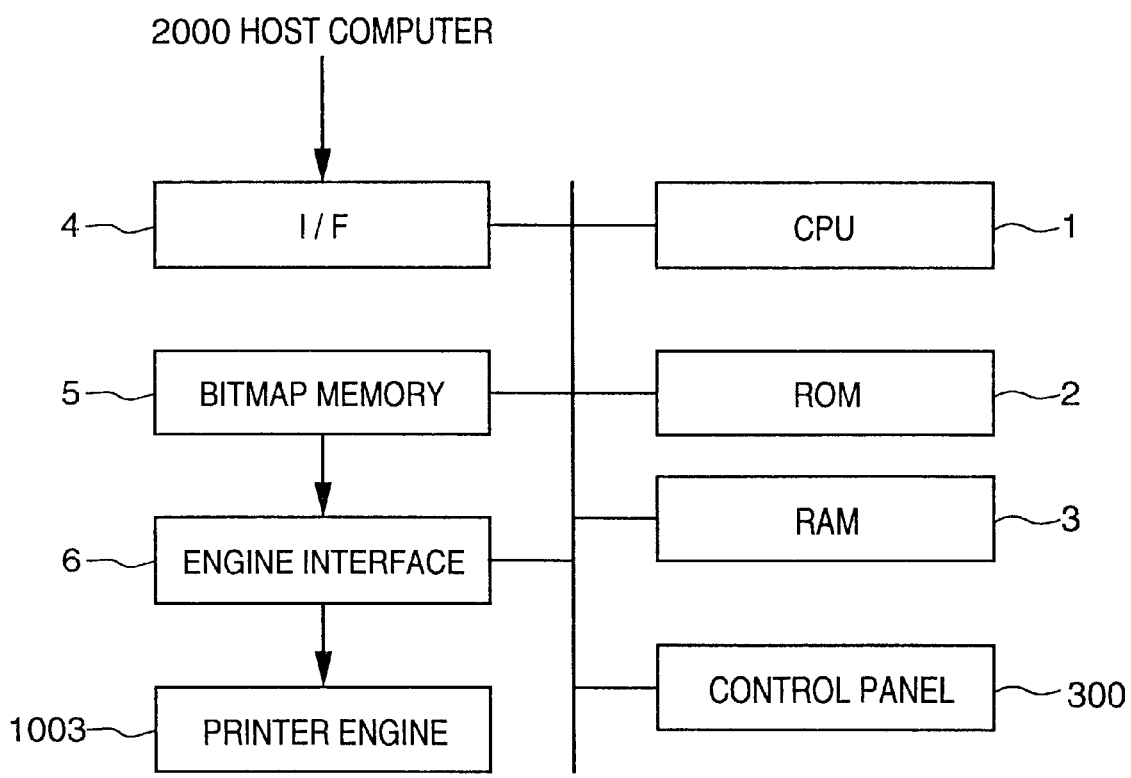
FIG. 13 is a block diagram showing a printing control section in the printer apparatus according to this embodiment.

FIG. 13 is a block diagram showing the printing control unit 101. The control unit 101 includes a CPU supervising overall control of the printer control unit 101 and printer apparatus 1000, a ROM 2 which stores font data as well as the operating procedure (inclusive of programs corresponding to the flowcharts described later) of the CPU 1, a RAM 3 providing a working area for the CPU 1 as well as a reception buffer area, an interface 4 for receiving print data from the host computer 2000, a bitmap memory 5 in which a bitmap image to be printed is developed, and an engine interface 6 for outputting the image developed in the bitmap memory 5 to a printing mechanism (the printer engine 7), shown in FIG. 12, as a video signal in single-line units.

Processing corresponding to the drawing analyzer 1001 and drawing unit 1002 shown in FIG. 4 is executed by the CPU 1 using the ROM 2, RAM 3 and bitmap memory 5, etc.

The details of the processing according to this embodiment constructed as set forth above will now be described. However, since the processing for receiving and analyzing the print data is performed in accordance with well-known procedures, the following description focuses mainly on the drawing of line drawings in the bitmap memory 5.

Figure 5:
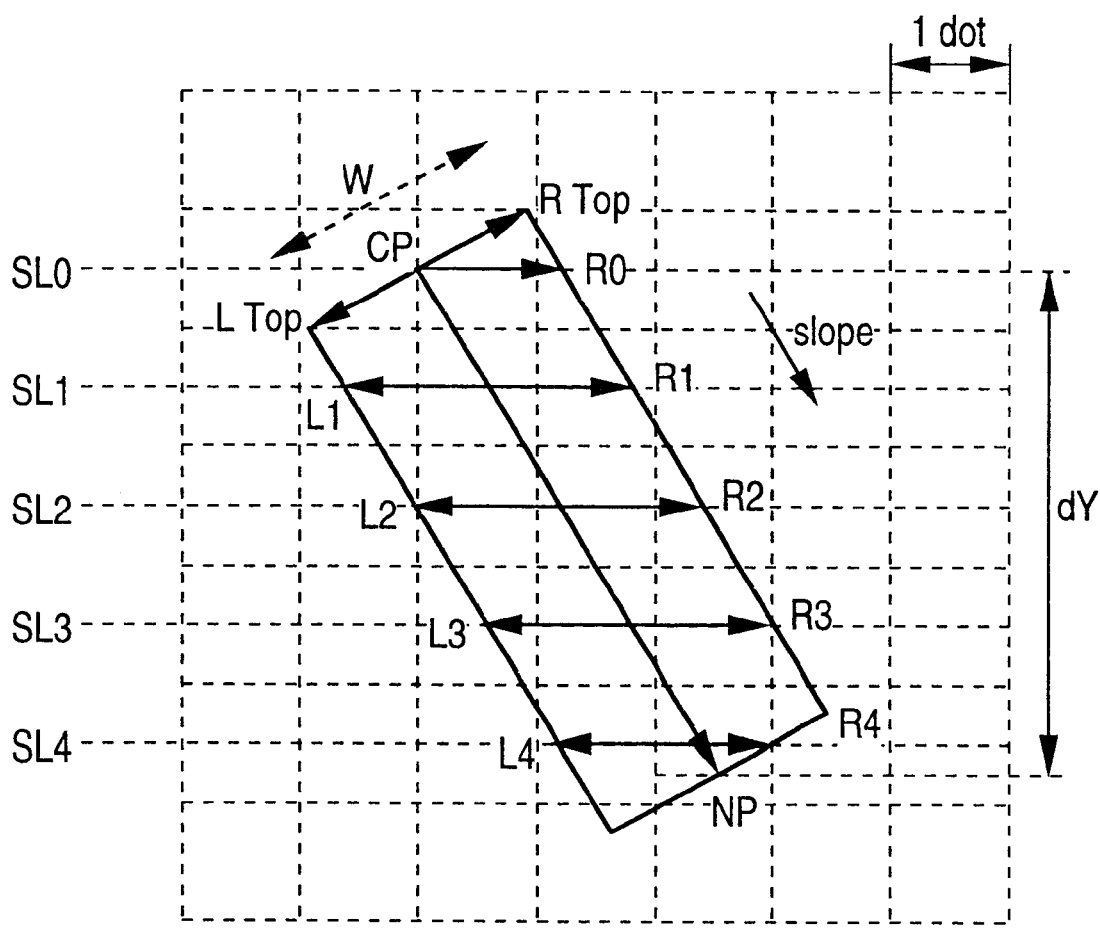
FIG. 5 is a diagram for describing processing for drawing a slanted line in this embodiment.
Figure 6:
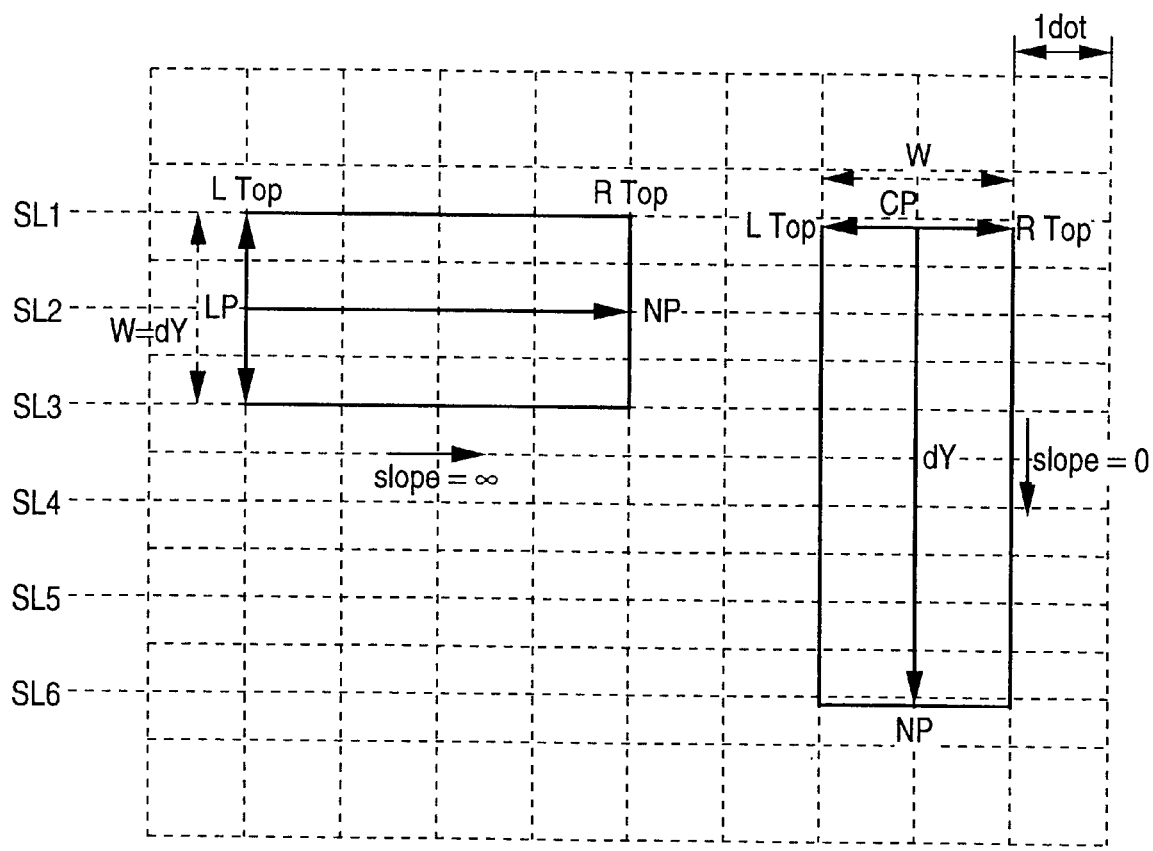
FIG. 6 is a diagram for describing processing for drawing horizontal and vertical lines in this embodiment.
Figure 7:
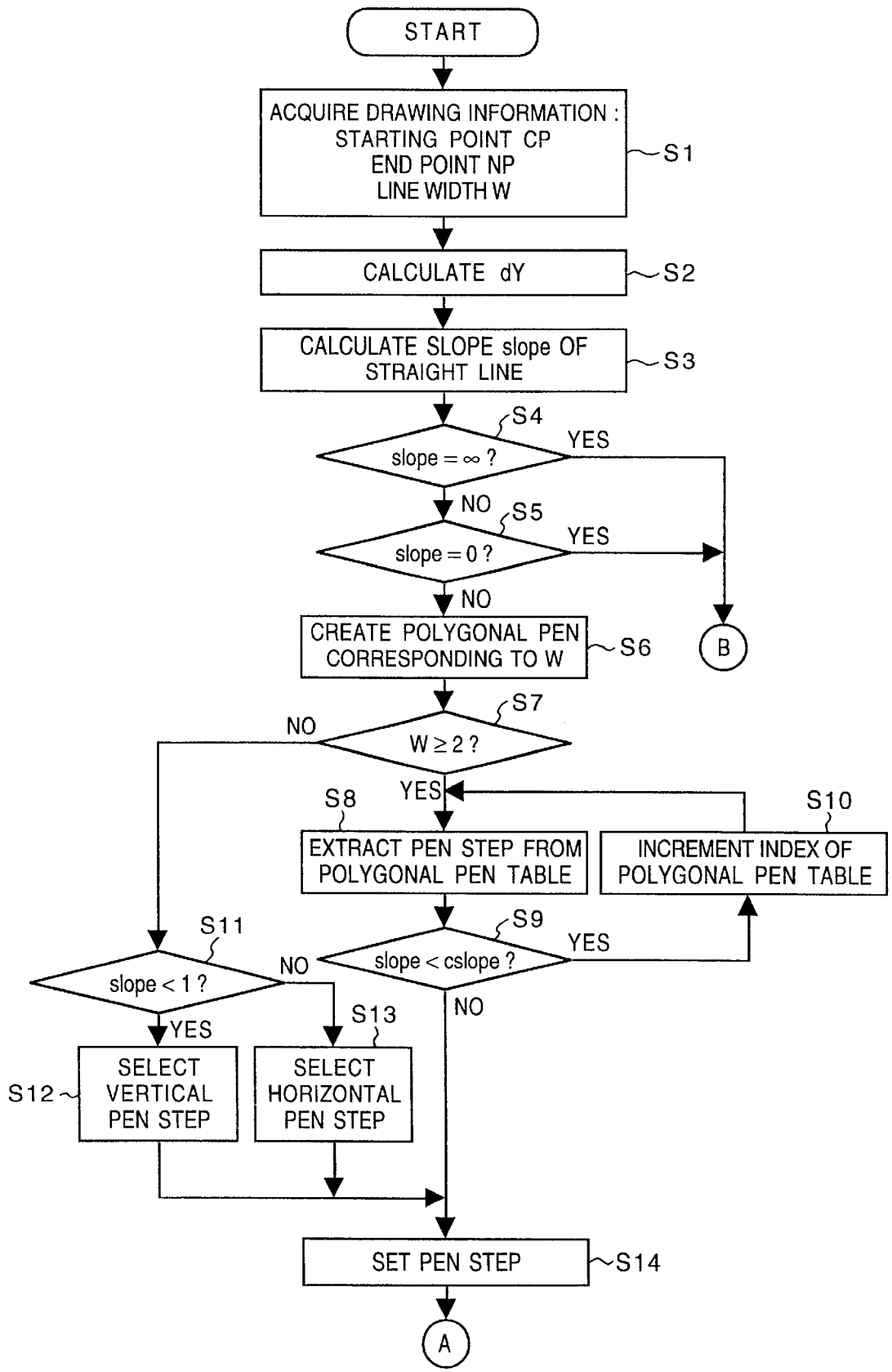
FIG. 7 is a flowchart illustrating a processing procedure for drawing a line drawing in this embodiment.
Figure 8:
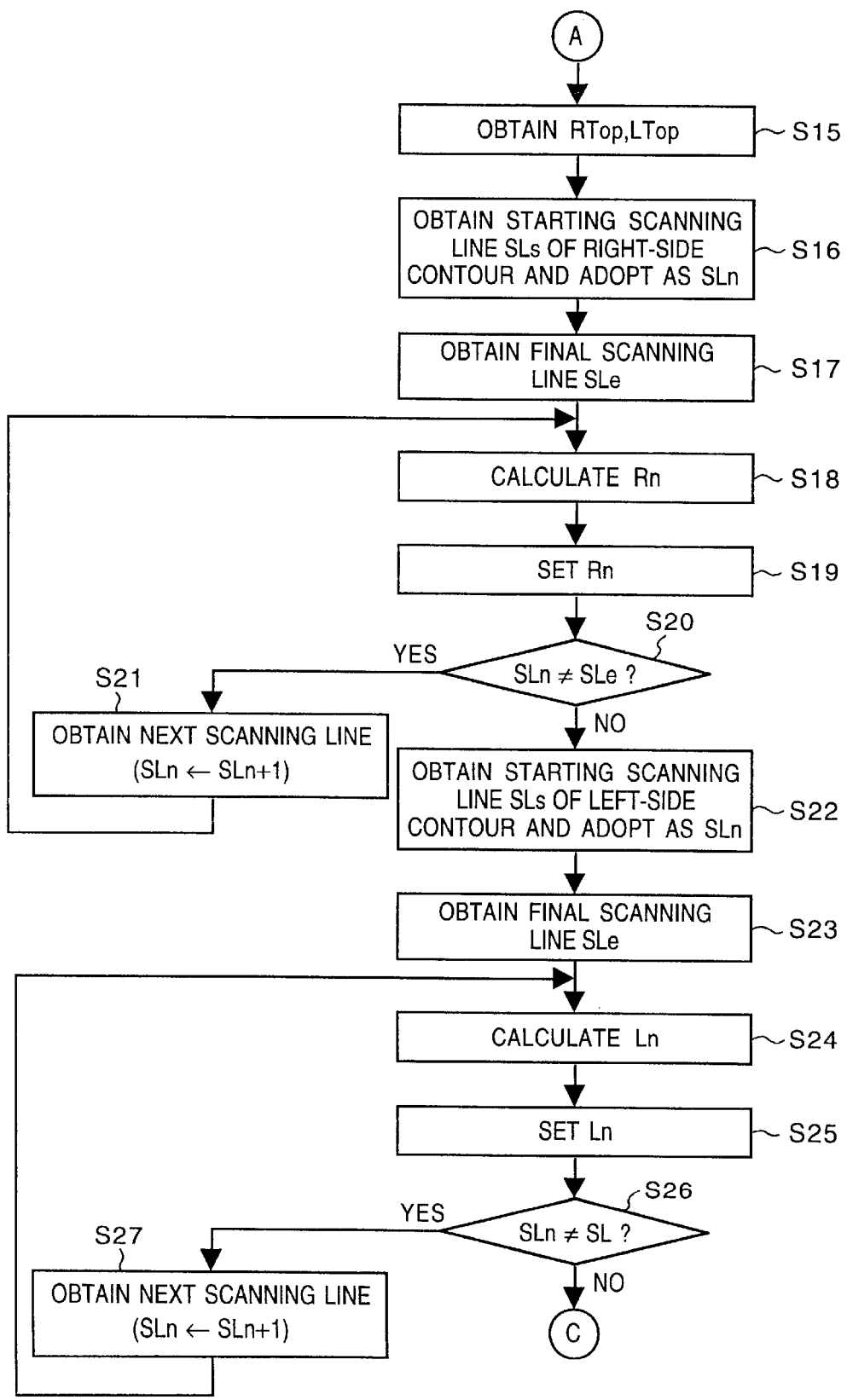
FIG. 8 is a flowchart illustrating a processing procedure for drawing a line drawing in this embodiment.
Figure 9:
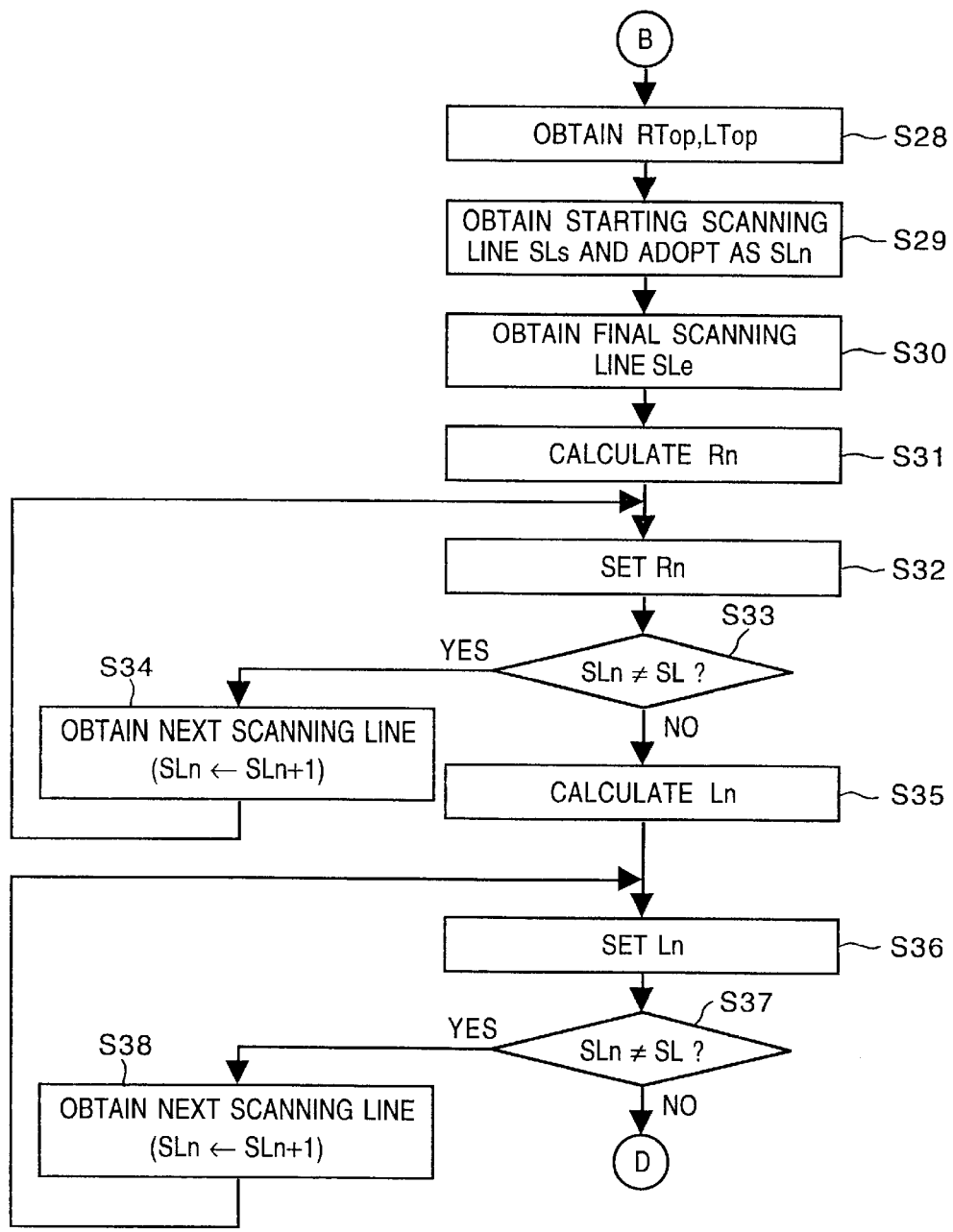
FIG. 9 is a flowchart illustrating a processing procedure for drawing a line drawing in this embodiment.

FIGS. 5 and 6 illustrate examples of straight lines drawn by the present embodiment. FIGS. 7 through 9 are flowcharts illustrating algorithms according to this embodiment.

It is required that the following initial information (drawing information) be set in order to draw a line drawing:

a) drawing starting position (CP)

b) drawing end position (NP)

c) line width (W)

Drawing information is acquired at step S1 in FIG. 7. Amount of movement dY in the y direction of the stroke is obtained at step S2 and the inclination "slope" of the stroke is obtained at step S3 (where "slope" represents the amount of movement of the x coordinate in units of the y coordinate).

If the slope is found to be horizontal ("slope"=∞) or vertical ("slope"=0) at steps S4 and S5, then processing proceeds to FIG. 9. Otherwise a polygonal pen conforming to the line width W is created at step S6.

If line width is found to be less than 2 at step S7, then processing proceeds to step S11 in order to arrange it so that a pen step of an intermediate angle will not be used. If "slope" is found to be less than 1 at step S11, then a vertical pen step is selected at step S12. If "slope" is found to be equal to or greater than 1 at step S11, then a horizontal pen step is selected at step S13. The pen step selected is set at step S14. It should be noted that the value of "slope" mentioned here does not take sign (plus or minus) into account.

If the line width is found to be equal to or greater than 2 at step S7, then the processing of steps S8~S10 is executed repeatedly. This processing involves searching a polygonal pen table and extracting a pen step having a slope nearest the calculated "slope". The pen step thus retrieved is set at step S14.

Next, processing proceeds to step S15 in FIG. 8. Here RTop and LTop (see FIG. 5) are obtained from CP (drawing starting position) and cvertex(x,y) of the set pen step.

Next, processing is executed with regard to the contour line on the right side starting from RTop.

A processing starting scanning line SLs is obtained from CP and the pen step and SLs is substituted into a variable SLn at step S16. A processing end scanning line SLe is obtained from NP (drawing end position) and the pen step at step S17. Next, at steps S18~S21, the x coordinate Rn of the contour line at SLn is obtained from "slope" and processing proceeds to the next scanning line SLn+1. If the equality SLn=SLe is established at step S20, then processing of the left contour line starting from LTop begins.

Figure 10:
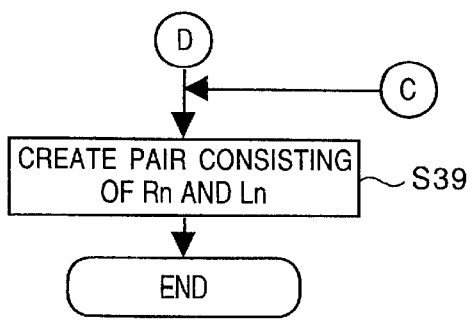
FIG. 10 is a flowchart illustrating a processing procedure for drawing a line drawing in this embodiment.

Processing similar to that of steps S16~S21 is executed at steps S22~S27 and the program proceeds to step S39 in FIG. 10.

If "slope" is found to be horizontal or vertical, the following processing is executed without using a polygonal pen to obtain RTop and LTop:

In case of a vertical line, RTop, LTop are obtained from CP and W/2 at step S28 in FIG. 9. Further, SLs, SLe are obtained at steps S29, S30, respectively.

In case of a horizontal line, RTop, LTop are obtained from CP, W/2 and NP, W/2 taking into consideration the sense of the straight line. Further, SLs, SLe are obtained from LTop (RTop). (The foregoing coordinates are the same for the left and right contour lines.)

Next, Rn at SLs is found at step S31. The same value is set as the x coordinate of the right contour line at steps S32~S34 until the equality SLn=SLe is established.

Processing similar to that of steps S31~S34 is executed at steps S35~S38 with regard to the left contour line.

When the final scanning line is reached, the program proceeds to step S39 in FIG. 10. From the left and right contour-line information obtained above, only a pair on the same scanning line is extracted and adopted as valid data. Processing is then terminated.

This is followed by delivering the obtained information to the next level of processing and executing drawing processing.

As a result of the foregoing, when a straight line having a given line width is drawn, a pair of left and right items of contour information on the same scanning line can be extracted. Accordingly, it will suffice to subsequently execute simple processing in which the space between the starting and end point of each scanning line is drawn by a straight line in accordance with the extracted pair.

Modification

The changeover condition at step S7 in the foregoing embodiment is premised on the fact that there will be no effect upon shape, taking into account the characteristics of drawing processing, and the condition is set in order to avoid the occurrence of a problem in which the form of the straight line does not appear at all owing to use of a polygonal pen of an intermediate angle. However, in the case of another line width, it is possible with this modification to establish a setting in which a changeover is made in response to a request from the user, by way of example. In such case it will suffice to create only a vertical or horizontal pen step and it will be unnecessary to retrieve a pen step. This makes possible processing at a comparatively high speed.

Figure 11:
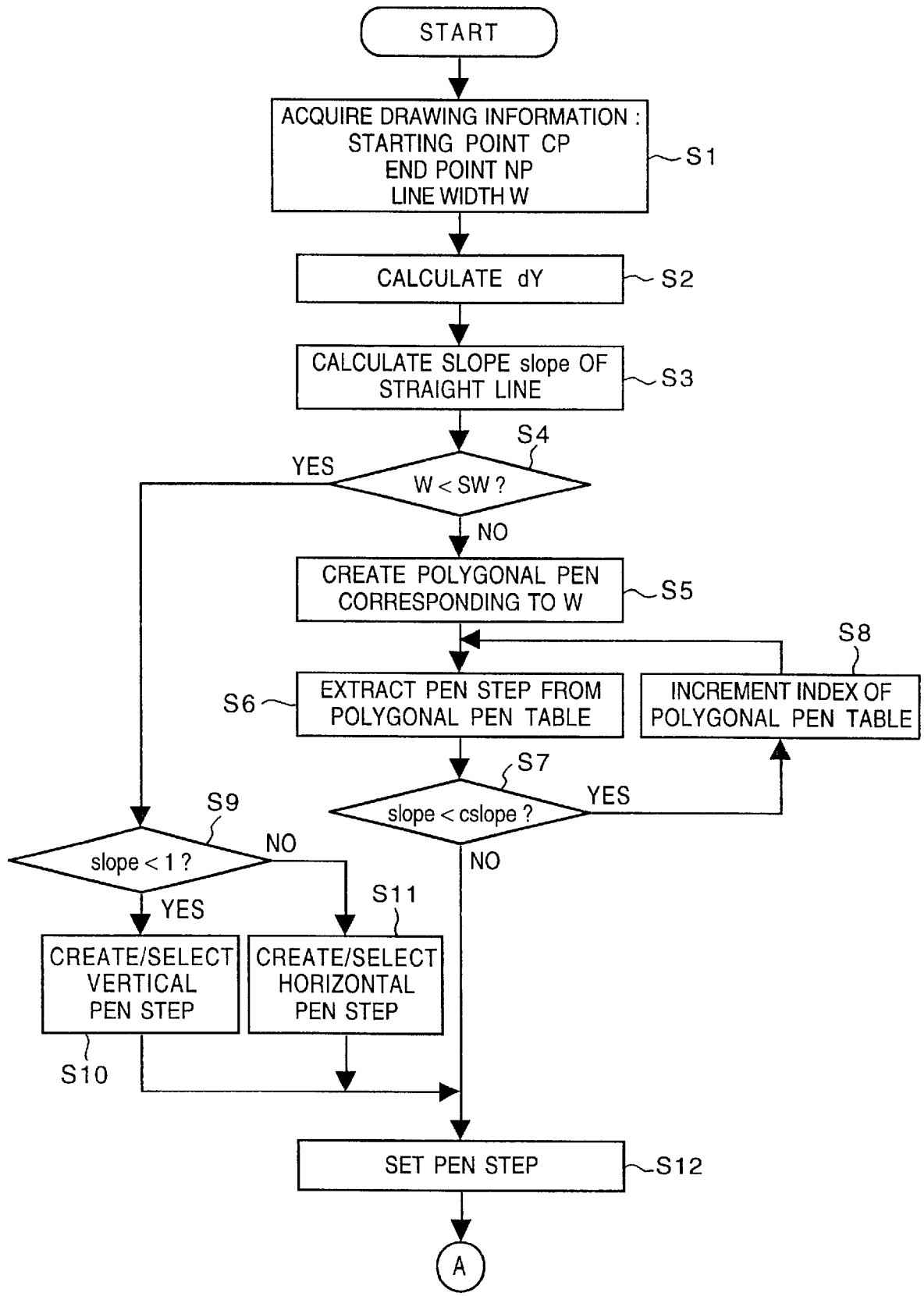
FIG. 11 is a flowchart illustrating a modification of a processing procedure for drawing a line drawing in this embodiment.

Processing is executed in accordance with the flowchart of FIG. 11 rather the flowchart of FIG. 7.

In this case, it is determined at step S4 in FIG. 11 whether the line width W is less than a changeover boundary line width SW specified by the user. If the answer is "YES", then the program proceeds to step S9, which is processing for using pen steps in only two directions. When "slope" is found to be less than 1 at step S9, only a vertical pen step is created and selected at step S10. Otherwise, only a horizontal pen step is created and selected.

More specifically, in a case where the line width W is equal to or greater than the line width SW specified by the user, a polygonal pen corresponding to W is created at step S5 and then the usual processing is executed at steps S6~S8. After the pen step is set at step S12, the program proceeds to the processing of FIG. 8.

Second Embodiment

A second embodiment of the present invention will now be described.

When a straight line connecting two points is drawn on a display device, processing for obtaining a point (dot) expressed by physical coordinates on the straight line is executed in the manner set forth below.

Figure 14:
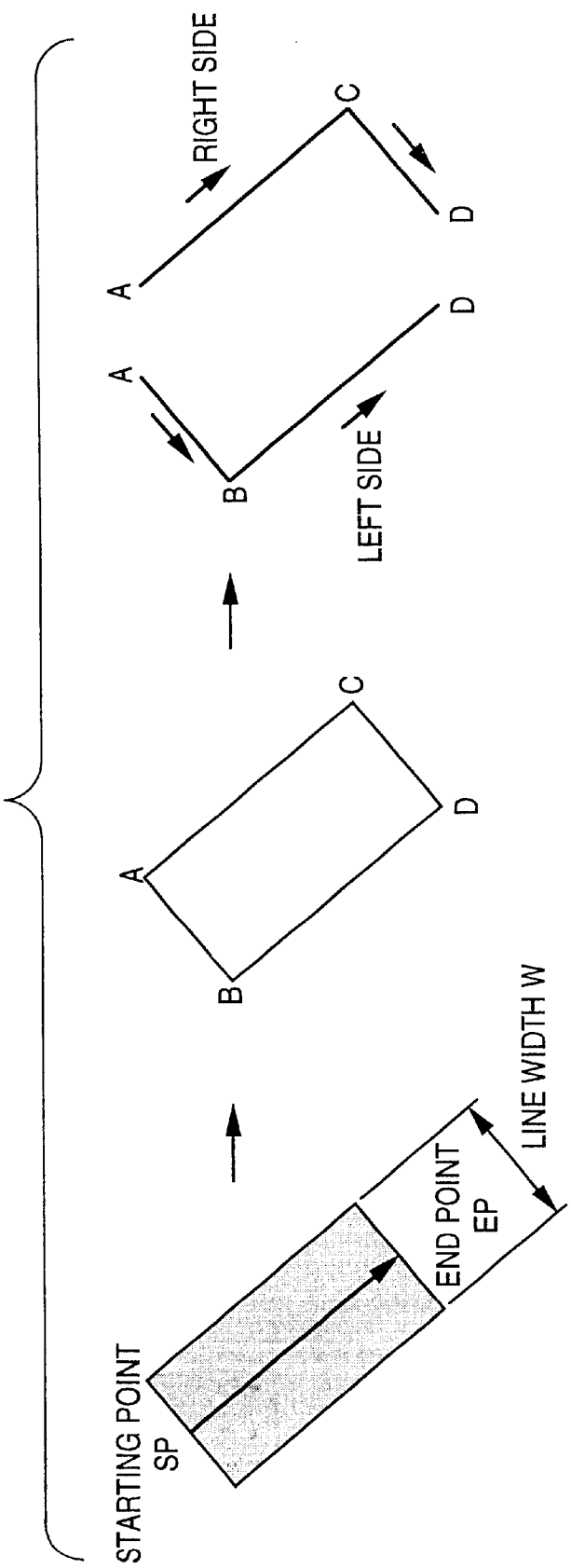
FIG. 14 is a diagram for describing the essentials of drawing a line drawing according to a second embodiment of the present invention.

In a case where a line having the line width W is drawn from a starting point SP to an end point EP in FIG. 14(A), the apices A, B, C and D of the contour line are obtained from the slope and width W of the straight line, as shown in (B) of FIG. 14. The contour line is divided into a left side (ABD) and a right side (ACD) based upon these apices, as shown in (C) of FIG. 14.

The x coordinates of the points at which each side intersects the base line of a scanning line (horizontal line) are then obtained.

Figure 15:
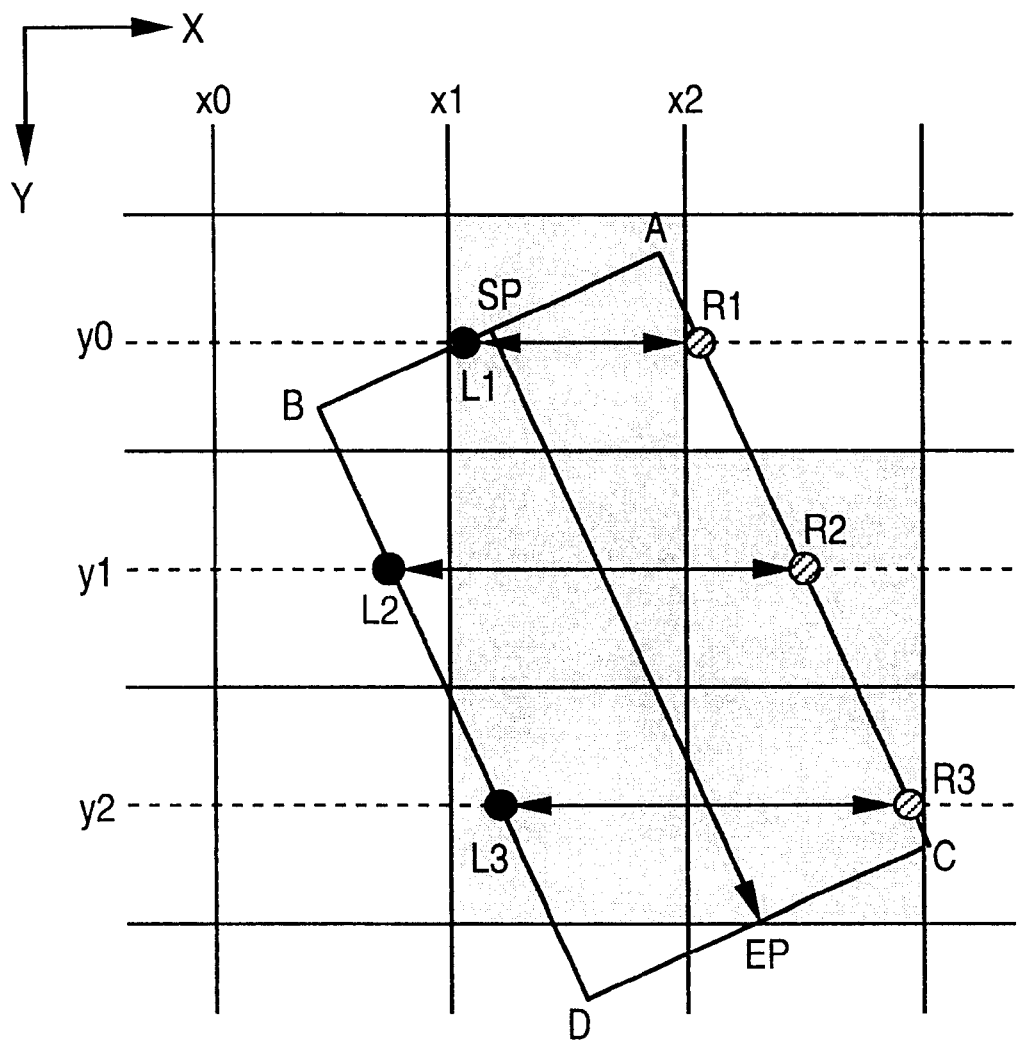
FIG. 15 is a diagram showing the relationship between drawing starting and end points of each scanning line of a line drawing according to the second embodiment.

In FIG. 15, the starting point of the left side is point A and this side intersects a scanning line y0 first. The x coordinate of this intersection therefore is designated L1. After x coordinates L2, L3 at which the left side intersects scanning lines y1, y2 are obtained via point B, processing for this side ends at point D.

Similarly, with regard to the right side, x coordinates R1, R2, R3 are obtained starting from point A and processing ends at point D via point C.

From among the obtained x coordinates of each side, those on the same scanning line are taken as one set and coordinates from dots on which the left-side x coordinates (L1, L2, . . . ) reside to dots on which the right-side coordinate (R1, R2, . . . ) reside are taken as physical coordinate points on the straight line. If at least half of Ln, Rn (n=1, 2, 3, . . . ) lies within the contour lie, then the dot thereof is construed as being included as well.

Drawing of the straight line is carried out based upon the set of left and right point information of each scanning line obtained through the method described above.

However, the above-described processing is premised on the fact that, from among the x-coordinate points obtained on the left side or right side, there are coordinates that are a pair on the same scanning line. If the x coordinates do not form a pair, they are treated as being invalid data.

Figure 16A:
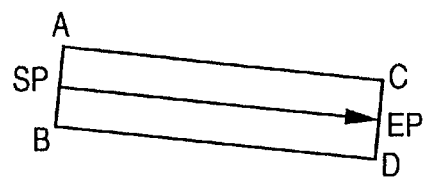
FIGS. 16A to 16C are diagrams showing a slanted line that is nearly a horizontal line according to the second embodiment.

Consider a case where a straight line whose slope is very nearly horizontal is drawn (see FIG. 16A).

When the slope of a straight line becomes nearly horizontal, processing for obtaining physical coordinates in the vicinity of the apices of the contour line becomes inconvenient. Consequently, if a certain fixed slope has been exceeded, lines A–B and C–D in FIG. 16A are adopted as the left side and right side, respectively, and processing between A–C and between B–D is not carried out. Let a slope serving as a threshold value be represented by "slopeInf". A problem arises when the line width W and the y-coordinate component dY of the slope "slope" satisfy the conditions set forth below. The problem is that valid straight-line data cannot be created or the shape of the line is illegal.

1. In case of dY>W

Figure 16B:
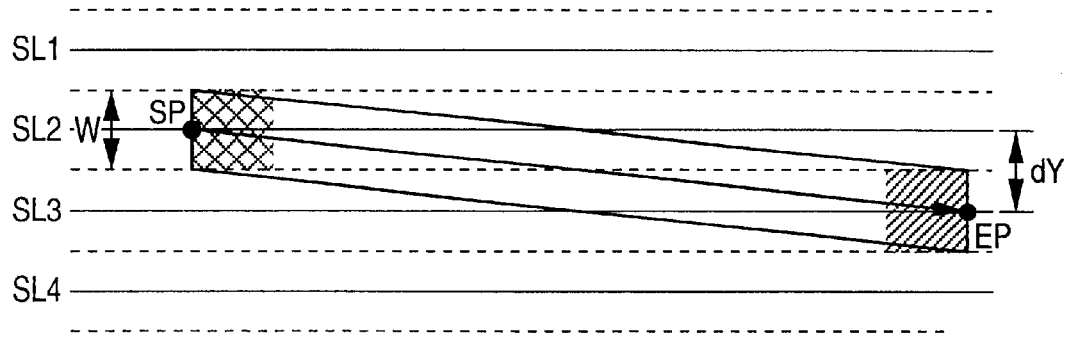

In a case where a straight line given by W=1, dY=1 is processed in FIG. 16B, the x coordinate of scanning line SL2 is found for the left side and the x coordinate of scanning line SL3 is found for the right side. Since W=1 holds, there is only one intersection with a scanning line. There is no right-side coordinate of a pair at SL2 and there is no left-side coordinate of a pair at SL3. Consequently, the data is invalid for any scanning line and a straight line will not be drawn.

2. In case of (dY<W) and (dY≠0)

Figure 16C:
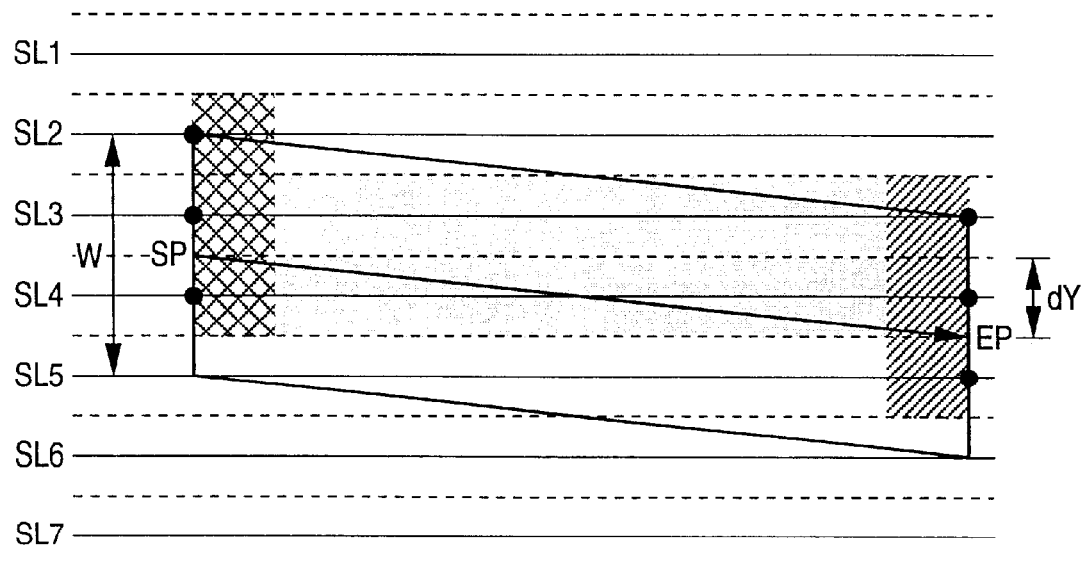

In a case where a straight line given by W=3, dY=1 is processed in FIG. 16C, the x coordinate of scanning lines SL2, SL3, SL4 is found for the left side and the x coordinate of scanning lines SL4, SL5, SL6 is found for the right side. Here SL2, SL5 become invalid data because there is no pair whereas SL3, SL4 become valid straight-line data. However, since the data of SL2, SL5 is missing, a slanted line originally having a difference in level equivalent to one dot in the vertical direction becomes a horizontal line.

Further, in case of W=3, dY=2, EP becomes one dot lower. As a result, the scanning line for which valid data is created is SL4 alone and a three-dot slanted line becomes a one-dot horizontal line.

The second embodiment solves this problem is one sweep. Specifically, processing is split into two types. That is, with regard to an ordinary straight line, processing for bringing forth the line width more accurately is executed. Separate processing for avoiding the shortcomings mentioned above is executed only with regard to the drawing of straight lines that satisfy the special conditions.

The construction of the apparatus according to the second embodiment is similar to that of the first embodiment set forth above. Only the content of processing is described below.

Figure 17A:
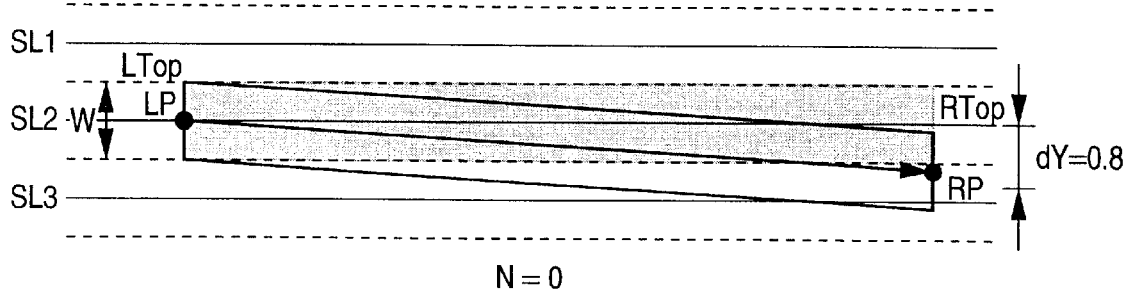
FIGS. 17A to 17C are conceptual views of a line-drawing drawing apparatus according to the second embodiment.
Figure 17B:
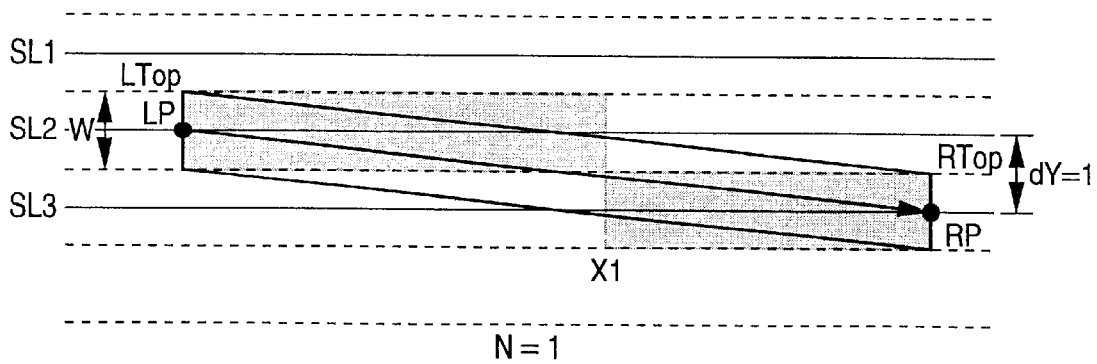
Figure 17C:
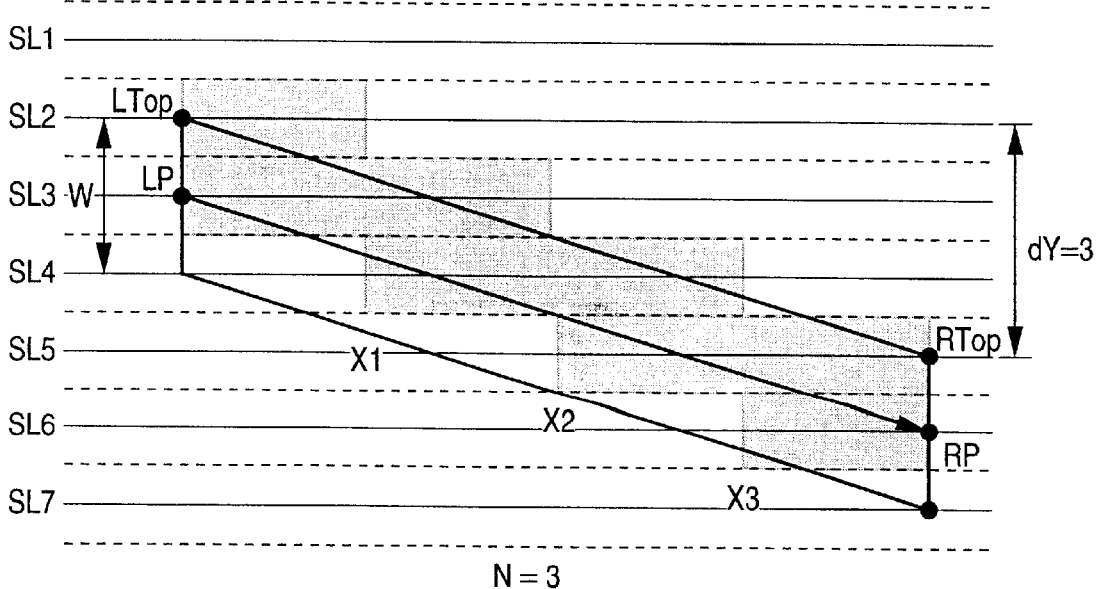
Figure 18:
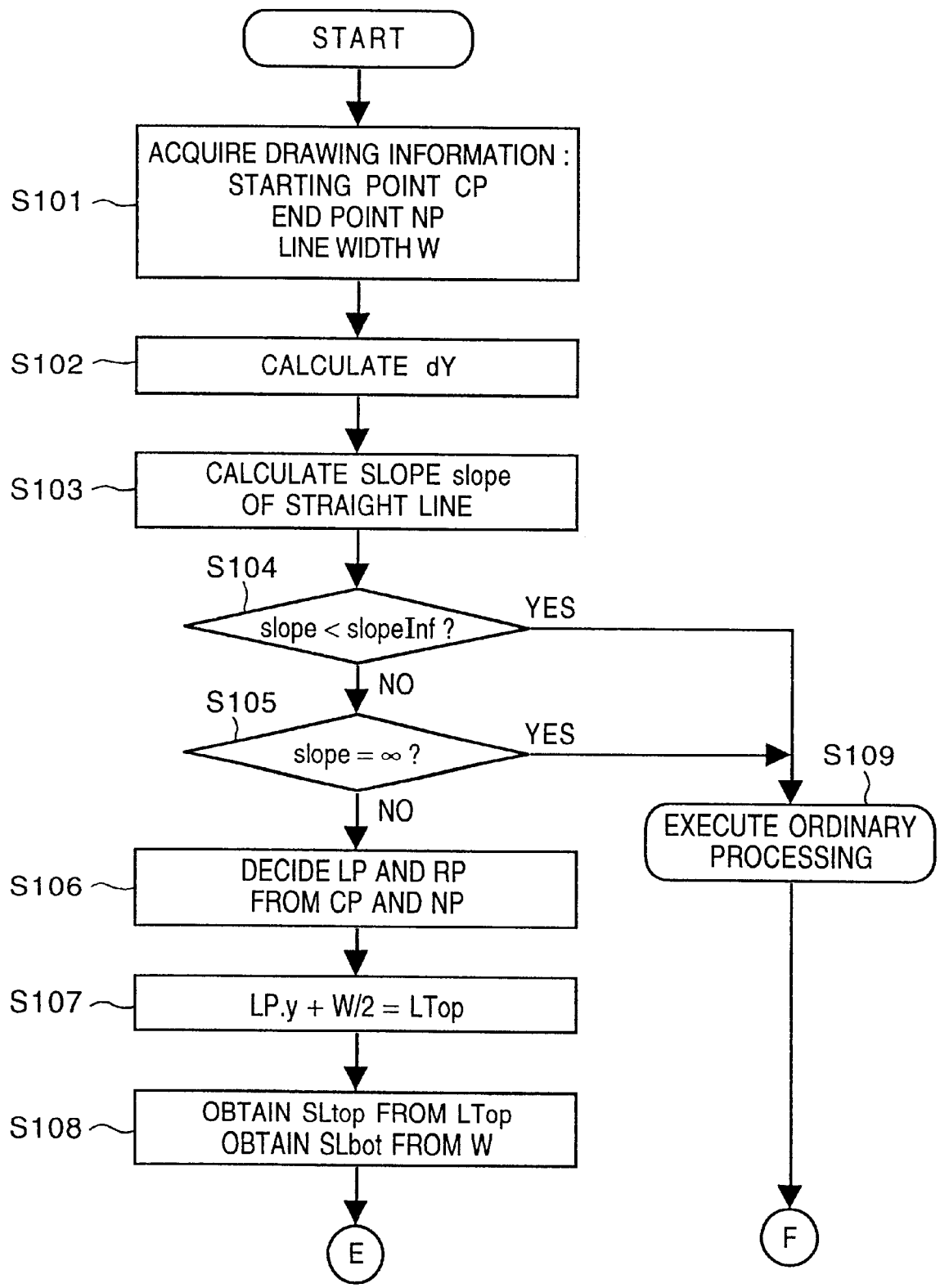
FIG. 18 is a flowchart showing a processing procedure for drawing a line drawing according to the second embodiment.
Figure 19:
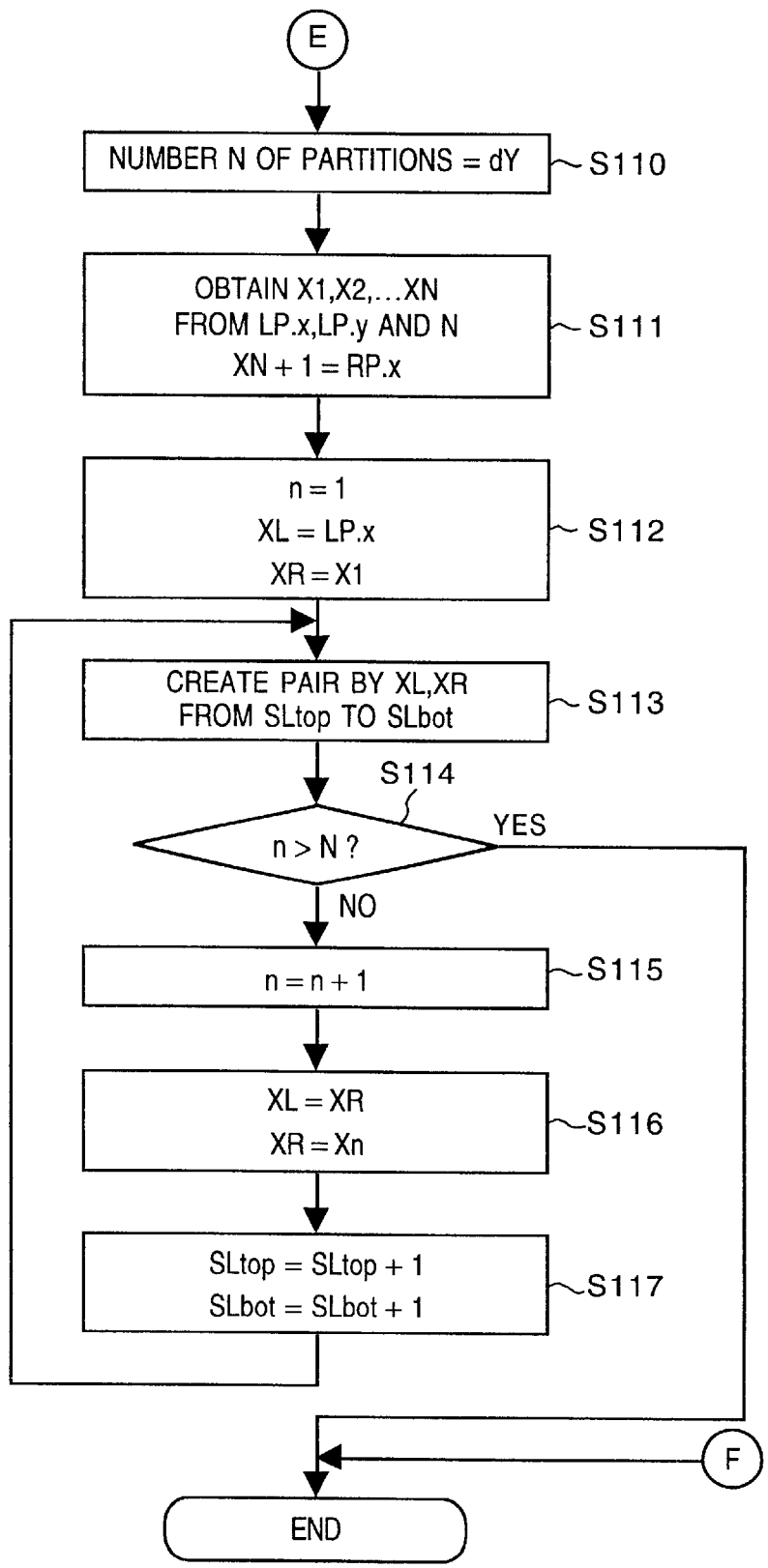
FIG. 19 is a flowchart showing a processing procedure for drawing a line drawing according to the second embodiment.

FIGS. 17A~17C illustrate straight lines drawn in the second embodiment. FIGS. 18 and 19 illustrate processing procedures (the corresponding programs of which are stored in the ROM 2) executed by the CPU 1 in the second embodiment.

In order to draw a line, the setting of the initial information is performed in a manner the same as that of the first embodiment.

a) draw starting position (CP)

b) draw end position (NP)

c) line width (W)

Further, if the slope of the straight line exceeds slopeInf (i.e. if the straight line is nearly horizontal), processing for obtaining physical coordinates is executed only on the contour lines between A–B and between C–D in FIG. 14.

The above-mentioned drawing information is acquired at step S101 in FIG. 18. Amount of movement dY in the y direction of the stroke is obtained at step S102 and the inclination "slope" of the stroke is obtained at step S103 (where "slope" signifies the amount of movement of the x coordinate in units of the y coordinate, namely $\Delta x/\Delta y$)).

It is determined at step S104 whether "slope" is less than slopeIft. If the answer is "NO", the program proceeds to step S109, ordinary drawing processing is executed and then processing is terminated.

On the other hand, if "slope" is equal to or greater than slopeIft, the program proceeds to step S105, where it is determined whether slope is infinitely large (perfectly horizontal). If the slope is perfectly horizontal, then special processing is unnecessary and the program proceeds to step S109.

In a case where it has been determined that slope is nearly horizontal but not perfectly horizontal, the program proceeds to step S106.

The left end LP and right end RP of the straight line are obtained based upon CP.x (the x coordinate of the starting point), NP.x (the x coordinate of the end point) and the size relationship between these (see FIGS. 17A~17C). Next, at step S107, LTop corresponding to the upper left corner of the contour line is obtained from the y coordinate LP.y of the left end and the line width W/2. This is followed by step S108, at which the top scanning line SLtop of the left side data is obtained from LTop and the bottom scanning line SLbo is obtained from a position obtained by adding W to LTop.

The program then proceeds to step S110 (FIG. 19), at which traveling distance dY in the y direction is made the number N of partitions between the two points. The decimal part of dY is discarded at this time. As a result, since dY is less than 1 in FIG. 17A, we have N=0 and there are no partitions. In FIG. 17B, N=1 holds, and hence partitioning is performed once. In FIG. 17C, N=3 holds and partitioning is performed three times.

Next, at step Sill, the amount of movement in the x direction of the straight line is equally partitioned from LP.x, RP.x, N and the x coordinates (physical coordinate values) of the partitioning positions are obtained.

This is followed by step S112, at which the initial value of the left-side data is made the physical coordinate corresponding to LP.x and the right-side data is made X1. Further, the current number n of processing operations is made 1.

Next, at step S113, the items of left-side data and right-side data in the range from scanning line SLtop to scanning line SLbot are made XL and XR, respectively. If n is found to be equal to or less than N at step S114, then the number of processing operations is incremented at step S115. Then, at step S116, XL is replaced by XR and XR is replaced by the x-coordinate Xn of the next partitioning position. This is followed by step S117, at which SLtop, SLbot are incremented, after which processing returns to step S113.

When the current number n of processing operations has come to exceed the number N of partitions at step S114 as a result of this processing, this means that processing has reached the right end of the straight line and, hence, processing ends.

Processing for drawing a straight line that conforms to the changeover conditions is thus terminated.

Other Embodiments

Though the present invention has been described with regard to bitmap development processing in a printer apparatus, the invention may be applied to bitmap development processing for a display in a host computer. Further, the present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system (OS) or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

In accordance with the present invention as described above, a technique in which processing is applied indiscriminately to the line segments that construct a figure is replaced by a technique through which the optimum processing stage is selected depending upon the drawing attributes (line width, slope of the line segment and shape, etc.) of the line segments per se and the particular figure in which the line segments are being used. This makes it possible to execute efficient drawing of graphics.

Further, in accordance with another aspect of the present invention, the conventional technique continues to be used in case of ordinary drawing of a straight line but drawing of a straight line in which the minimum shape is preserved is made possible under conditions in which satisfactory results of drawing are not obtained with the conventional technique.

As many apparently widely different embodiments of the present invention can be made without departing from the spirit and scope thereof, it is to be understood that the invention is not limited to the specific embodiments thereof except as defined in the appended claims.

What is claimed is:

1. A graphics processing apparatus for drawing a line defined by a drawing start point, a drawing end point and width, comprising:

determination means for determining whether a line to be drawn is horizontal or vertical;

first means for, in a case where said determination means determines that the line to be drawn is neither vertical nor horizontal, selecting a pen step from a polygonal pen table including a plurality of pen steps, defining a start point of left contour line and a start point of right contour line of the line to be drawn on the basis of the drawing start point of the line to be drawn and the selected pen step, and defining the left contour line and the right contour line on the basis of the defined start points and the slope of the line to be drawn;

second means for, in a case where said determination means determines that the line to be drawn is vertical, defining, without using a pen step, start points of left and right contour lines of the line to be drawn on the basis of the drawing start point and the width of the line to be drawn, and defining the left contour line and the right contour line on the basis of the defined start points, or, in a case where said determination means determines that the line to be drawn is horizontal, defining, without using a pen step, start points of left and right contour lines of the line to be drawn on the basis of the drawing start point, the drawing end point and the width of the line to be drawn;

drawing means for drawing the line by painting between the left and right contour lines defined by said first or second means.

2. The apparatus according to claim 1, further comprising output means for outputting the line drawn by said drawing means.

3. The apparatus according to claim 2, wherein said output means comprises a printer.

4. The apparatus according to claim 1, further comprising input means for inputting drawing information including start and end points and the width of the line to be drawn.

5. The apparatus according to claim 1, wherein a pen step includes data for the slope, direction and coordinates with regard to the start point and end point of the line to be drawn are included.

6. The apparatus according to claim 1, wherein said first means, in a case where said determination means determines that the line to be drawn is neither vertical nor horizontal, forms a polygonal pen table corresponding to the width of the line to be drawn, selects a pen step having a slope nearest to the slope of the line to be drawn from the formed polygonal pen table if the width of the line to be drawn is larger than a predetermined width, defines start points of the left and right contour lines on the basis of the selected pen step and the drawing start point, defining the left and the right contour lines on the basis of the defined start points and the slope of the line to be drawn.

7. The apparatus according to claim 6, wherein said predetermined width is "2".

8. The apparatus of claim 1, wherein said apparatus is included in a printer.

9. The apparatus according to claim 1, wherein said first means, in a case where said determination means determines that the line to be drawn is neither vertical nor horizontal, forms a polygonal pen table corresponding to the width of the line to be drawn, selects a pen step from the formed polygonal pen table, defines start points of the left and right contour lines on the basis of the selected pen step and the drawing start point, defining the left and the right contour lines on the basis of the defined start points and the slope of the line to be drawn.

10. A graphics processing method for drawing a line defined by a drawing start point, a drawing end point and width, comprising the steps of:

determining whether a line to be drawn is horizontal or vertical;

in a first case where it is determined in said determining step that the line to be drawn is neither vertical nor horizontal, selecting a pen step from a polygonal pen table including a plurality of pen steps, defining a start point of left contour line and a start point of right contour line of the line to be drawn on the basis of drawing the start point of the line to be drawn and the selected pen step, and defining the left contour line and the right contour line on the basis of the defined start points and the slope of the line to be drawn;

in a second case where it is determined in said determining step that the line to be drawn is vertical, defining, without using a pen step, start points of left and right contour lines of the line to be drawn on the basis of the drawing start point and the width of the line to be drawn, and defining the left contour line and the right contour line on the basis of the defined start points, or, in a case where the determining step determines that the line to be drawn is horizontal, defining, without using a pen step, start points of left and right contour lines of the line to be drawn on the basis of the drawing start point, the drawing end point and the width of the line to be drawn; and drawing the line by painting between the left and right contour lines defined by said first or second case.

11. The method according to claim 10, further comprising the step of outputting the line drawn in said drawing step.

12. The method according to claim 11, wherein said outputting step is performed using a printer.

13. The method according to claim 10, further comprising the step of inputting drawing information including start and end points and the width of the line to be drawn.

14. The method according to claim 10, wherein a pen step includes data for the slope, direction and coordinates with regard to the start point and end point of the line to be drawn are included.

15. The method according to claim 10, further comprising the step of making a judgment, by determining whether or not the width of the line to be drawn is less than a predetermined width if said determination means determines that the line to be drawn is neither vertical nor horizontal, wherein said forming-and-selecting step includes selecting a pen step of vertical or horizontal if said it is determined in said judgment-making step that the width of the line to be drawn is less than the predetermined width, while selecting a suitable pen step from the table if it is determined in said judgment-making step that the width of the line to be drawn is not less than the predetermined width.

16. The method according to claim 15, wherein said predetermined width is "2".

17. The method according to claim 10, wherein in said first case, where it is determined in said determining step that the line to be drawn is neither vertical nor horizontal, forming a polygonal pen table corresponding to the width of the line to be drawn, selecting a pen step from the formed polygonal pen table, defining start points of the left and right contour lines on the basis of the selected pen step and the drawing start point, defining the left and the right contour lines on the basis of the defined start points and the slope of the line to be drawn.

18. A memory medium storing program codes for causing performance of a graphics processing method for drawing a line defined by a drawing start point, a drawing end point and width, comprising the steps of:

determining whether a line to be drawn is horizontal or vertical;

in a first case where it is determined in said determining step that the line to be drawn is neither vertical nor horizontal, selecting a pen step from a polygonal pen table including a plurality of pen steps, defining a start point of left contour line and a start point of right contour line of the line to be drawn on the basis of drawing the start point of the line to be drawn and the selected pen step, and defining the left contour line and the right contour line on the basis of the defined start points and the slope of the line to be drawn;

in a second case where it is determined in said determining step that the line to be drawn is vertical, defining, without using a pen step, start points of left and right contour lines of the line to be drawn on the basis of the drawing start point and the width of the line to be drawn, and defining the left contour line and the right contour line on the basis of the defined start points, or, in a case where the determining step determines that the line to be drawn is horizontal, defining, without using a pen step, start points of left and right contour lines of the line to be drawn on the basis of the drawing start point, the drawing end point and the width of the line to be drawn; and drawing the line by painting between the left and right contour lines defined by said first or second case.

19. The memory medium according to claim 18, further comprising the step of outputting the line drawn in said drawing step.

20. The memory medium according to claim 19, wherein said outputting step is performed using a printer.

21. The memory medium according to claim 18, further comprising the step of inputting drawing information including start and end points and the width of the line to be drawn.

22. The memory medium according to claim 18, wherein a pen step includes data for the slope, direction and coordinates with regard to the start point and end point of the line to be drawn are included.

23. The memory medium according to claim 18, further comprising the step of making a judgment, by determining whether or not the width of the line to be drawn is less than a predetermined width if said determination means determines that the line to be drawn is neither vertical nor horizontal, wherein said forming-and-selecting step includes selecting a pen step of vertical or horizontal if said it is determined in said judgment-making step that the width of the line to be drawn is less than the predetermined width, while selecting a suitable pen step from the table if it is determined in said judgment-making step that the width of the line to be drawn is not less than the predetermined width.

24. The memory medium according to claim 23, wherein said predetermined width is "2".

25. The memory medium according to claim 18, wherein in said first case where it is determined in said determinating step that the line to be drawn is neither vertical nor horizontal, forming a polygonal pen table corresponding to the width of the line to be drawn, selecting a pen step from the formed polygonal pen table, defining start points of the left and right contour lines on the basis of the selected pen step and the drawing start point, defining the left and the right contour lines on the basis of the defined start points and the slope of the line to be drawn.

26. A program on which is stored a graphics processing method for drawing a line defined by a drawing start point, a drawing end point and width, comprising:

code for determining whether a line to be drawn is horizontal or vertical;

code for, in a first case, where it is determined in said determining step that the line to be drawn is neither vertical nor horizontal, selecting a pen step from a polygonal pen table including a plurality of pen steps, defining a start point of left contour line and a start point of right contour line of the line to be drawn on the basis of drawing the start point of the line to be drawn and the selected pen step, and defining the left contour line and the right contour line on the basis of the defined start points and the slope of the line to be drawn;

code for, in a second case, where it is determined in said determining step that the line to be drawn is vertical, defining, without using a pen step, start points of left and right contour lines of the line to be drawn on the basis of the drawing start point and the width of the line to be drawn, and defining the left contour line and the right contour line on the basis of the defined start points, or, in a case where the determining step determines that the line to be drawn is horizontal, defining, without using a pen step, start points of left and right contour lines of the line to be drawn on the basis of the drawing start point, the drawing end point and the width of the line to be drawn; and code for drawing the line by painting between the left and right contour lines defined by said first or second case.

27. The program according to claim 26, further comprising code for outputting the line drawn in said drawing step.

28. The program according to claim 27, wherein said outputting is performed using a printer.

29. The program according to claim 27, further comprising code for inputting drawing information including start and end points and the width of the line to be drawn.

30. The program according to claim 26, wherein a pen step includes data for the slope, direction and coordinates with regard to the start point and end point of the line to be drawn are included.

31. The program according to claim 26, further comprising code for making a judgment, by determining whether or not the width of the line to be drawn is less than a predetermined width if said determination means determines that the line to be drawn is neither vertical nor horizontal, wherein said forming-and-selecting step includes selecting a pen step of vertical or horizontal if said it is determined in said judgment-making step that the width of the line to be drawn is less than the predetermined width, while selecting a suitable pen step from the table if it is determined in said judgment-making step that the width of the line to be drawn is not less than the predetermined width.

32. The program according to claim 31, wherein said predetermined width is "2".

33. The program according to claim 26, wherein in said first case, where it is determined in said determining step that the line to be drawn is neither vertical nor horizontal, forming a polygonal pen table corresponding to the width of the line to be drawn, selecting a pen step from the formed polygonal pen table, defining start points of the left and right contour lines on the basis of the selected pen step and the drawing start point, defining the left and the right contour lines on the basis of the defined start points and the slope of the line to be drawn.

* * * * *

UNITED STATES PATENT AND TRADEMARK OFFICE
CERTIFICATE OF CORRECTION

PATENT NO. : 6,297,828 B1
DATED : October 2, 2001
INVENTOR(S) : Sanae Fukuzawa

It is certified that error appears in the above-identified patent and that said Letters Patent is hereby corrected as shown below:

Column 2,
Line 11, "processing-is" should read -- processing is --; and
Line 24, "times" should read -- time --.

Column 7,
Line 59, "contour lie" should read -- contour line --.

Column 12,
Line 42, "horizontal if said it is" should read -- horizontal if it is --.

Column 14,
Line 46, "horizontal if said it is" should read -- horizontal if it is --.

Signed and Sealed this

Twenty-first Day of May, 2002

JAMES E. ROGAN
*Director of the United States Patent and Trademark Office*

*Attest:*

*Attesting Officer*